United States Patent [19]

Kuhn

[11] E Re. 29,664

[45] Reissued June 13, 1978

[54] HYDRAULIC PULLEY APPARATUS

[75] Inventor: Charles Joseph Kuhn, Lujunga, Calif.

[73] Assignee: Kansas Jack, Inc., McPherson, Kans.

[21] Appl. No.: 286,182

[22] Filed: Sept. 5, 1972

Related U.S. Patent Documents

Reissue of:

[64] Patent No.: 3,589,680
Issued: June 29, 1971
Appl. No.: 738,450
Filed: June 20, 1968

[51] Int. Cl.[2] ..... B21D 1/14

[52] U.S. Cl. ..... 72/444; 72/705; 254/198

[58] Field of Search ..... 72/705, 444; 254/188, 254/189, 139, 139.1; 187/26

[56] References Cited

U.S. PATENT DOCUMENTS

| | | | |
|---|---|---|---|
| 316,070 | 4/1885 | Shaw | 254/189 |
| 1,810,680 | 6/1931 | Rothgarn | 254/189 |
| 2,426,114 | 8/1947 | Novotney | 187/26 |
| 3,078,075 | 2/1963 | Richter | 254/189 |
| 3,149,660 | 9/1964 | Smith | 72/705 |
| 3,275,170 | 9/1966 | MacRay | 187/26 |
| 3,338,083 | 8/1967 | Eck | 72/705 |
| 3,340,720 | 9/1967 | Chartier | 72/705 |

*Primary Examiner*—C.W. Lanham
*Assistant Examiner*—Gene P. Crosby
*Attorney, Agent, or Firm*—Fishburn, Gold & Litman

[57] ABSTRACT

Hydraulic pulley apparatus including a frame, anchored to a tiedown assembly, supporting a first pulley on a movable axis and a second pulley on a selectably fixed axis. A cable or chain extends over the first and second pulleys and is connected at one end to the frame, with the other end being attached to a workpiece. The pulleys are arranged in such a manner that movement of the first pulley away from the second pulley draws the end of the chain attached to the workpiece toward the second pulley. The movement of the first pulley is accomplished by selectively operable and controllable hydraulic power means. A third pulley may be mounted on the frame at various positions above the first and second pulleys for receiving the end of the chain attached to the workpiece, and maintaining the chain at various attitudes. Locking means hold the chain under tension to permit release of the hydraulic power means for sequential operation thereof.

8 Claims, 9 Drawing Figures

HYDRAULIC PULLEY APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a pulley apparatus and, more particularly, to a novel hydraulically actuated pulley apparatus adapted to be attached to a member of a structural body, such as an automobile, for pulling the member with respect to the body for moving, straightening or performing any other desired work on the member or the body itself during the repair thereof.

2. Description of the Prior Art

Heretofore, it has been the conventional practice to use handtools, such as angle irons and crowbars in repairing automobile body parts. The advantage in using such tools is the easy maneuverability of the tools and the ready access that these tools permit in reaching these parts. Although these tools have been successfully employed in the past, several problems and difficulties have been encountered which severely limit their utilization.

On occasions when a large amount of force is needed in pulling or straightening body members, the pulling force generated by these leverage tools is usually insufficient to move these members. Furthermore, in order to gain any leverage, the body members sometimes act as a fulcrum for the tools. This oftentimes results in marring the appearance of or even damaging the members, which, of course, is undesirable. What is often required in aligning or straightening a body member is a steady continuous force acting to move the member only a few inches, but to an exact position. A common fault of the handtools is overpull, where a short burst of force carries the member past its intended aligned position.

It is recognized therefore, that in many situations some mechanical apparatus must be used in providing the means for working on automotive body members. A common means used is a pulley arrangement such as a block and tackle apparatus. In such a device, the mechanical advantage developed by the pulleys provides the pulling force that is required. However, such devices are usually not maneuverable enough to permit widespread usage and often require overhead beams, cranes, and other expensive and unwieldy apparatus. As a general rule, the angle of the pulling force on a body member varies numerously, depending on the position of the member and the manner in which it must be straightened or aligned. Since the block and tackle must be anchored from the same angle as the direction of the pulling force, such a device is often impractical to employ because such various anchoring positions are not readily available or, in fact, possible.

SUMMARY OF THE INVENTION

Accordingly, the problems and difficulties encountered with the conventional means and apparatuses mentioned above are obviated by the present invention which provides a hydraulic pulley apparatus supporting a first cable or chain which is adapted to be attached to a workpiece from a variety of positions. The hydraulic pulley apparatus includes a frame having a base portion mounted on wheels for easy maneuverability and portability. The upper portion of the frame is anchored to a tiedown assembly by a second cable or chain. The first chain is adapted to be connected at one end to the workpiece and at the other end to attachment means located on the base portion of the frame. A hydraulic piston and cylinder combination is pivotally connected at one end to the base portion with a first pulley being connected to a piston rod extending out of the other end of the cylinder. A second pulley is rotatably mounted on the frame adjacent the anchored portion thereof. The two pulleys and the attachment means are arranged in such a fashion that the first chain extends from the attachment means, around the first pulley, then around the second pulley in the opposite direction, and finally to the workpiece, forming a modified S-shaped configuration. Upon actuation of the piston-cylinder combination, the piston rod extends out of the cylinder to move the first pulley away from the attachment means and the second pulley, thereby drawing the end of the chain, attached to the workpiece, toward the second pulley. A novel lock mechanism is provided for holding the chain under tension during the work operation to permit release of the hydraulic power for sequential operation of the hydraulic piston to obtain pulling action for greater distances than the length of the piston.

In one form of the invention, the apparatus is provided with a third pulley adapted to be mounted in various positions on the frame above the second pulley to receive the cable or chain extending from the second pulley to the workpiece. Securing means are mounted on the third pulley for anchoring the third pulley to the tiedown assembly.

In another form of the invention, the apparatus is provided with a fourth pulley freely mounted on the cable or chain located between the second and third pulleys to function as a block and tackle arrangement.

Therefore, it is among the primary objects of the present invention to provide a highly maneuverable pulley apparatus for working on body members of an automobile.

Another object of the present invention is to provide a portable pulley apparatus that is capable of varying the angle of pulling force acting on the body member.

Another object of the present invention is to provide a portable pulley apparatus that is operable by hydraulic actuation.

Another object of the present invention is to provide a portable pulley apparatus that can be transported and operated in many environments.

Still another object of the present invention is to provide a novel pulley apparatus that is capable of various adaptabilities for a variety of uses.

Still other objects, features and attendant advantages of the present invention, together with various modifications, will become apparent to those skilled in the art from a reading of the following detailed description of the preferred embodiment constructed in accordance therewith, taken in conjunction with the accompanying drawings wherein like numerals designate like parts in the several figures.

DESCRIPTION OF THE PREFERRED EMBODIMENT

Figure 1:
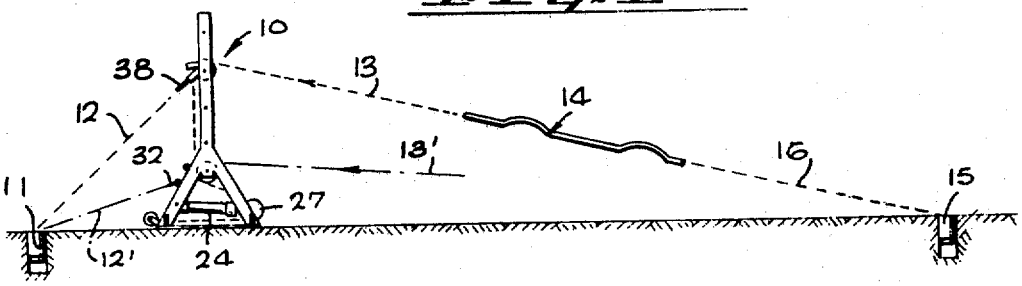
FIG. 1 is an elevational view, partly diagrammatic, illustrating a hydraulic pulley apparatus in accordance with the present invention in an operative position in connection with a body member.

Referring now to FIG. 1, hydraulic pulley apparatus in accordance with the present invention is indicated generally at 10 and is anchored as to a tiedown device 11 by means of a cable or chain 12, shown in broken lines. The pulley apparatus 10 can also be secured to the tiedown device 11 at a second lower position, indicated in phantom lines at 12'. This option depends on the position from which the pulley apparatus 10 is pulling a cable or chain, a first position chain being shown in broken lines at 13 and a second position chain being shown in phantom lines at 13'.

In the operative position in which the chains are shown in broken lines, the chain 13 extends from the pulley apparatus 10 and is connected to a body member or workpiece 14. The body member 14 is illustrative only, and may be a bent automobile frame requiring straightening, in which case it is shown securely anchored as to a second tiedown device 15 by means of a cable or chain 16 for restrained rigidity against the pull of the apparatus 10.

Figure 2:
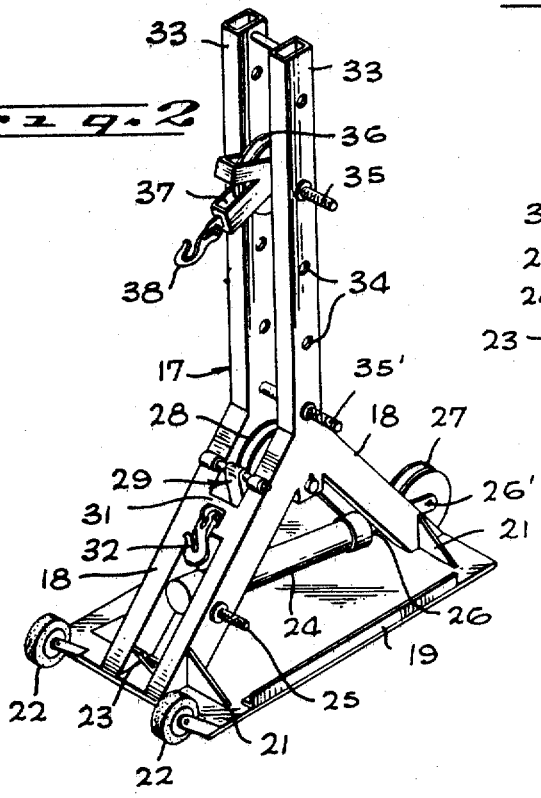
FIG. 2 is a perspective view of the pulley apparatus showing the novel hydraulic actuating means.
Figure 3:
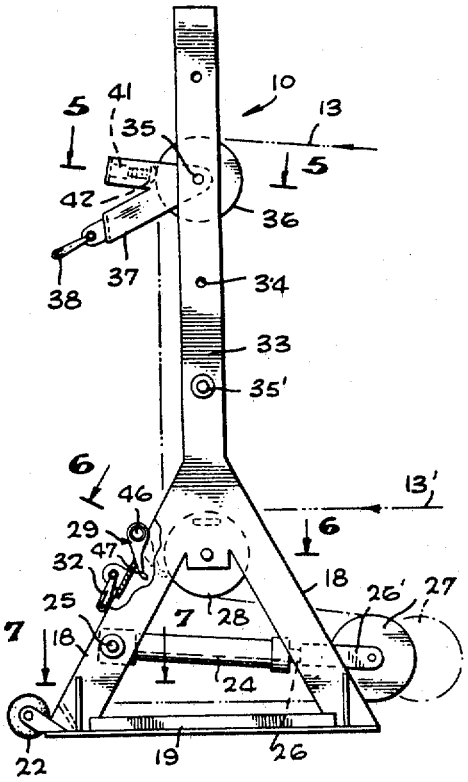
FIG. 3 is an enlarged elevational view, partly broken away, of the pulley apparatus showing the cable or chain by broken lines.

Referring now in detail to FIGS. 2 and 3, the hydraulic pulley apparatus 10 includes a frame 17 having a pair of bifurcated legs 18 integrally connected to a base platform 19 and being vertically supported by gussets 21. The platform 19 acts as the sole support of the frame 17 in its operable position. However, a pair of wheels 22 are connected to one end of the platform 19 and are utilized to transport the whole apparatus to various work stations.

Located between the legs 18 and integrally connected to the platform 19 is a notched attachment plate 23, adapted to receive the chain 13. A hydraulic cylinder 24 is also located between the legs 18 and is pivotally connected thereto by pin means 25. A piston is axially movable within the cylinder 24 and is hydraulically controllably actuated in the conventional manner. A piston rod 26 is connected to the piston, extends out of the free end of the cylinder 24, and is integrally provided at its free end with a yoke 26' upon which a first pulley 27 is rotatably mounted so as to rotate about a movable axis.

Also located between the base legs 18 is a second pulley 28 rotatably mounted on the base legs 18 at their union. A lock mechanism 29 is pivotally mounted on the legs 18 adjacent the second pulley 28. Located on a cross brace 31 integrally connecting the legs 18 is a hook 32 adapted for connection to the anchor chain 12' of FIG. 1.

A pair of stanchions 33 are integrally connected to the base legs 18 at their union and include a plurality of vertically spaced holes 34 for selectively receiving a pin 35 or 35'. The pin 35 is utilized to rotatably support a third pulley 36 in a plurality of vertical positions. The positioning of the pulley 36 depends on the height desired and the angle of the pulling force of the cable 13 required. A modified V-shaped member 37 is also pivotally connected to the pin 35 on both sides of the third pulley 36. A hook 38 is connected to the lower leg of the member 37 and is adapted for connection to the anchor chain 12 of FIG. 1.

Referring to FIG. 3, the chain 13 is adapted to operate in various configurations. In one circuit, one end of the chain 13 is connected to the attachment means 23. The chain 13 then extends horizontally to the first pulley 27, around the pulley 27 and then to the second pulley 28 in the reverse direction. The chain 13 then extends horizontally to the first pulley 27, around the pulley 27 and then to the second pulley 28 in the reverse direction. The chain 13 then extends around the second pulley 28 and finally in a horizontal direction to be attached to the body member 14. As can be seen, this first circuit forms a modified S-shaped configuration.

The second circuit illustrated shows the chain 13 extending from the attachment means 23, around the first pulley 27 and to the second pulley 28, as done previously. However, in this circuit, the chain 13 extends partially around the second pulley 28 and then vertically to the third pulley 36. The chain 13 then extends around the third pulley 36 and onward to the body member 14. In this modified S-shaped configuration, the upper loop of the "S" is larger than the lower loop. As previously stated, the height of the third pulley 36 can be adjusted as desired.

Figure 4:
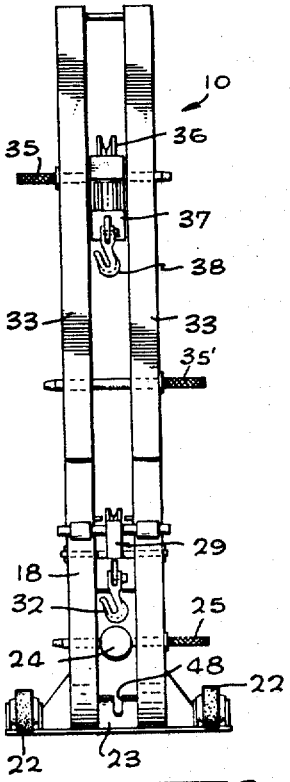
FIG. 4 is a front elevational view of the pulley apparatus as seen from the left in FIG. 3.

As more clearly shown in FIG. 4, the pins 35 and 35' can be easily removed for ease of installation and convertibility of the third pulley 36. It should also be noted that all three of the pulleys lie in the same vertical plane negating the possibility of developing any bending moments in the axial direction of the pulleys.

Figure 5:
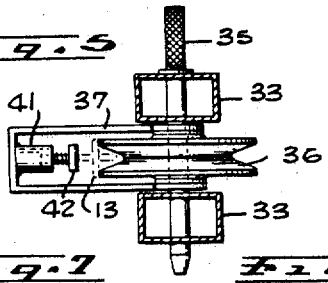
FIG. 5 is a fragmentary plan view, partially in section, of the upper pulley, taken substantially along line 5—5 of FIG. 3.

FIG. 5 shows a spring detent mechanism 41 including a bearing member 42 located on the member 37 and spring biased against the chain 13 as it extends over the third pulley 36. This detent mechanism 41 serves to retain the chain 13 in a taut condition between the pulleys 28 and 36 to prevent the occurrence of slack or twist in the chain.

Figure 6:
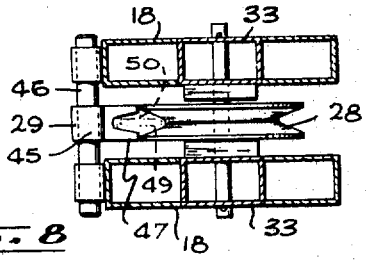
FIG. 6 is a fragmentary plan view, partially in section, of the second pulley, taken substantially along line 6—6 of FIG. 3 and showing the locking means.
Figure 8:
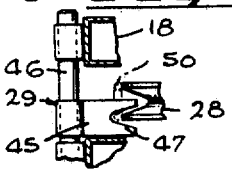
FIG. 8 is a fragmentary view similar in aspect to FIG. 6 and showing the locking means in a different position.

Referring now in detail to FIGS. 6 and 8, the lock mechanism 29 includes a latch 45 pivotally mounted on a cross rod 46 secured to both base legs 18. The latch 45 is bifurcated to provide a pair of prongs 47 for engagement with the links of the chain 13. As illustrated by FIGS. 6 and 8, the latch 45 is axially movable along the cross rod 46. In FIG. 6, the latch 45 is in a center position whereby a link 49 in the chain is located between the prongs 47, which in turn engage the top side of the link 50 directly below the link 49 shown between the prongs 47. In FIG. 8, the latch 45 has been axially moved on its cross rod 46 to a side position whereby only one of the prongs 47 engages the inner portion of the registering link 50 by insertion therethrough. As seen most clearly in FIG. 3, the prong or prongs 47 bear against the pulley 28 to limit the upward rotational movement of the latch 45 to achieve the locking function. The positioning of the latch 45 is done manually depending on the registration of the chain links. The advantage of this adjustable locking means 29 is that it can engage and lock the chain 13 at any link when it is desired to lock the chain under tension, as when retracting the hydraulic piston 26 preparatory to a sequential stroke.

Figure 7:
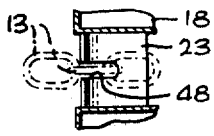
FIG. 7 is a fragmentary plan view, partially in section, of the chain attachment to the frame, taken along line 7—7 of FIG. 3.

FIG. 7 more clearly shows the chain 13 being connected to the attachment means 23. This is accomplished simply by inserting the cross link of the chain 13 into the shot 48 for abutment obstruction retention of the next link.

Figure 9:
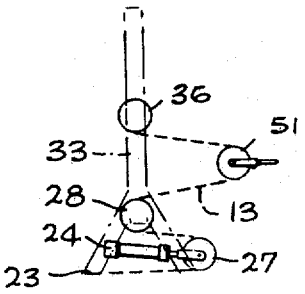
FIG. 9 is a diagrammatic elevational view of the pulley apparatus utilizing another arrangement of pulleys.

Referring now to FIG. 9, the pulley apparatus has been modified to include a fourth pulley 51 acting as a block and tackle means. In this arrangement, the chain 13 extends from the attachment means 23, around the first and second pulleys 27 and 28, around the free-floating pulley 51 and finally is fixedly attached to the third pulley 36 or other securing means on the stanchions 33. The pulley 51 is then adapted to be hooked on to any workpiece such as the body member 14 or a chain thereto.

The operation of the pulley apparatus will be more clearly understood with reference to FIGS. 1 and 3. With the pulley apparatus 10 in the operable position where only the first two pulleys 27 and 28 are utilized, the chain 12' is connected to the lower hook 32 for anchoring to the tiedown device 11. The chain 13' is connected to the attachment means 23 and extends around the pulley 27. Initially, the piston rod 26 is located in its retracted position within the cylinder 24. Upon actuation of piston and cylinder 24, the piston rod 26 and its integral yoke 26' extend outwardly, moving the pulley 27 from its position shown in solid lines to a position shown in broken lines, the length of travel depending upon the length of the piston stroke. As the pulley 27 moves away from the attachment means 23 and the second pulley 28, the lower portion of the "S" is extended with the portion of the chain 13' ahead of the second pulley 28 being drawn over the second pulley 28. This obviously exerts a pulling force on whatever the object or body may be to which the free end of the chain 13' is attached, for performing work thereon in a direction toward the second pulley 28. If further work movement is required, the chain 13' is retained in its tensioned position at the pulley 28 by means of the lock mechanism 29, and the pulley 27 is then returned to its starting position by release of the hydraulic pressure in the cylinder 24. The chain slack below the pulley 28 caused by this retracting movement is then taken up by removing the chain from the attachment means 23 and manually pulling the chain taut again over the piston pulley 27. The registering link is placed into the attachment means 23 in this new location and the entire process is repeated as often as desired in order to pull the body member 14 or other object toward the second pulley 28. It should be noted that, in this operation, the horizontal component of the load on the chain 12' is equal and opposite to the horizontal component of the load of the chain 13' so that there are no resultant force components generated externally to cause an upsetting moment arm on the frame 17. Also, the external forces caused by the chains 12' and 13' act on a single point on the frame 17 thereby not causing any torsional effects within the frame. The frame 17, therefore, is perfectly stable with no need for further anchor means, it being noted that the resultant vertical force component of all external forces applied to the frame 17 is downward. Such a simple tiedown procedure greatly enhances the operability of the pulley arrangement since the apparatus can be easily maneuvered to various locations without the need of securing the frame 17 directly to the ground.

Furthermore, if a different angle or elevation of pulling force is required, the third pulley 36 is utilized. The pulley 36 is adjustable to various positions depending upon the attitude of the chain 13 required. This positioning is accomplished by inserting the pin 35 through any pair of holes 34 desired. When the position of the pulley 36 is fixed, the chain 12 is then secured to the hook 38. The operation of this arrangement is essentially the same as the previous operation, with the body member 14 being drawn toward the third pulley 36. In this arrangement, as before, the horizontal force components of the chains 12 and 13 are equal and opposite, the internal loads acting on the frame 17 are balanced and no torsional effects are produced. Therefore, the frame 17 is stable with no further anchoring means required.

The operation of the block and tackle means shown in FIG. 9 is also substantially the same as the previous operations with the pulley 51 being drawn toward the second pulley 28. Again it can be readily seen that the external and internal forces acting on the apparatus are balanced and the device is stable.

It is important to note that the cylinder 24 is pivotally connected to the frame 17 so that there is no binding of the piston rod 26 within the cylinder 24 due to any moment arm otherwise created by the force of the chain on the piston pulley 27.

What I claim is:

1. A pulley apparatus adapted to rest on a floor comprising:

a frame having a base and an upper vertical stanchion;

attachment means located on said base;

a horizontally oriented hydraulic cylinder connected to said base above said attachment means and having a piston rod axially movable therein and extending out of one end of the cylinder for substantially horizontal reciprocation;

a first pulley rotatably mounted on the end of said piston rod for substantially horizontal reciprocation therewith;

a second pulley rotatably mounted on said frame above said hydraulic cylinder, said first pulley adapted to travel in a direction away from said attachment means and said second pulley;

means connected to said frame adjacent said second pulley adapted for anchoring said frame relative to said floor;

flexible chain means removably connected at one end to said attachment means, said flexible chain means further extending around said first pulley in one direction and around said second pulley in the opposite direction, with the other end adapted to be attached to a workpiece; and selectively operable lock means mounted on said frame adjacent said second pulley for preventing travel of said chain in a direction toward said workpiece whereby, upon extension of the piston rod, the displacement of the first pulley draws the flexible chain means over the two pulleys causing the end of the flexible chain means attached to the workpiece to be displaced toward the second pulley in a direction opposite that of the first pulley.

2. The invention as defined in claim 1 wherein said lock means includes a latch pivotally mounted on said frame and having a pair of prongs extending out of the free end for engagement with said chain and rotation limiting engagement with said second pulley.

3. The invention as defined in claim 2 wherein said latch is axially movable for selective engagement of at least one of said prongs with said chain notwithstanding the registration of said chain.

4. A pulley apparatus adapted to rest on a floor comprising:

a frame having a base and an upper vertical stanchion;

attachment means located on said base;

a horizontally oriented hydraulic cylinder connected to said base above said attachment means and having a piston rod axially movable therein and extending out of one end of the cylinder for substantially horizontal reciprocation;

a first pulley rotatably mounted on the end of said piston rod for substantially horizontal reciprocation therewith;

a second pulley rotatably mounted on said frame above said hydraulic cylinder, said first pulley adapted to travel in a direction away from said attachment means and said second pulley;

means connected to said frame adjacent said second pulley adapted for anchoring said frame relative to the floor;

a third pulley rotatably mounted on said frame stanchion;

said frame stanchion including means for adjusting the vertical position of said third pulley;

said third pulley being provided with means adapted for anchoring said frame relative to the floor; and flexible means removably connected at one end to said attachment means, said flexible means further extending around said first pulley in one direction and around said second pulley in the opposite direction and extending around said third pulley between said second pulley and a workpiece, with the other end adapted to be attached to the workpiece whereby, upon extension of the piston rod, the displacement of the first pulley draws the flexible means over the three pulleys causing the end of the flexible means attached to the workpiece to be displaced toward the second pulley in a direction opposite to that of the first pulley.

5. A pulley apparatus for the application of force to an automobile body member for the bending of the automobile body member, said apparatus being portable and resting on a floor, said apparatus comprising:

a frame having a floor-engaging base and first and second upwardly extending stanchions;

attachment means located on said frame;

a hydraulic cylinder secured to said frame, said cylinder being located between said stanchions, a piston rod in said cylinder mounted for reciprocation with respect to said cylinder;

a first pulley pivotally mounted on the end of said piston rod for reciprocation therewith;

a second pulley rotatably mounted between said stanchions on a pivot pin extending between said stanchions;

flexible means having a first end attached to said attachment means, said flexible means extending between said stanchions, around said first pulley and around said second pulley; and a lock mechanism pivotally mounted on at least one of said stanchions to swing between said stanchions toward said second pulley, said lock mechanism engaging said flexible means extending around said second pulley so that said flexible means can move around said second pulley toward said first pulley and is restrained from opposite motion.

*6. An apparatus for applying a pulling force to structures comprising:*

*a. a base adapted to engage a surface for support thereon;*

*b. a standard mounted on said base and upstanding therefrom;*

*c. an extensible member having one end thereof pivotally connected to a fixed point relative to said base;*

*d. a flexible member adapted to be connected to a structure to receive a pulling force;*

*e. means actuated by said extensible member and having a portion engaging said flexible member to apply a pulling force thereto in response to extension of said extensible member;*

*f. means mounted on said standard above said pulling force applying means for guiding said flexible member into engagement therewith;*

*g. means mounted on said standard and engageable with said flexible member to hold same against retractive movement upon contraction of said extensible member and to permit said flexible member to move in one direction and limit movement in the opposite direction;*

*h. a fixedly mounted anchor spaced from said base; and*

*i. means adapted to be connected to said anchor and to said standard at a point alignable with said flexible member guiding means for holding said standard against movement toward the structure to receive the pulling force when said extensible member is extended to effect said pulling force.*

*7. The apparatus for applying a pulling force as set forth in claim 6 wherein:*

*a. said base is an elongate planar member;*

*b. said standard is formed of a pair of laterally spaced parallel frames;*

*c. each of said frames has a side member mounted adjacent each end of said base and extending upwardly therefrom said converging at an intersection above the longitudinal center of said base; and*

*d. each of said frames has a post extending upwardly from the intersection of said base members.*

*8. A portable apparatus for applying a pulling force to structures comprising:*

*a. an elongate planar base member adapted to engage a surface for support thereon;*

*b. a standard mounted on said base and upstanding therefrom;*

*c. roller means mounted on said base and normally positioned above same for movably supporting said base and standard when said base and standard are moved to engage said roller means with the support surface;*

*d. an extensible member having one end thereof pivotally connected to a fixed point relative to said base;*

*e. a flexible member adapted to be connected to a structure to receive a pulling force;*

*f. means actuated by said extensible member and having a portion engaging said flexible member to apply a pulling force thereto in response to extension of said extensible member;*

*g. means mounted on said standard above said pulling force applying means for guiding said flexible member into engagement therewith;*

*h. means mounted on said standard and engageable with said flexible member to hold same against retractive movement upon contraction of said extensible member and to permit said flexible member to move in one direction and limit movement in the opposite direction;*

*i. an anchor fixedly mounted in the support surface; and*

*j. a second flexible member adapted to be connected to said anchor and to said standard at a point alignable with said guiding means for said first named flexible member to hold said standard against movement toward the structure to receive the pulling force when said extensible member is extended to effect said pulling force.*

* * * * *